United States Patent [19]
Emm et al.

[11] 3,921,145
[45] Nov. 18, 1975

[54] MULTIREQUEST GROUPING COMPUTER INTERFACE

[75] Inventors: Michael Gene Emm, Sierra Madre; Dongsung Robert Kim, El Monte, both of Calif.

[73] Assignee: Burroughs Corporation, Detroit, Mich.

[22] Filed: Oct. 12, 1973

[21] Appl. No.: 406,115

[52] U.S. Cl. .............................................. 340/172.5
[51] Int. Cl.² ....................... G06F 3/00; G06F 13/00
[58] Field of Search ....................... 340/172.5; 445/1

[56] References Cited

UNITED STATES PATENTS

| | | | |
|---|---|---|---|
| 3,308,439 | 3/1967 | Tink et al. | 340/172.5 |
| 3,395,394 | 7/1968 | Cottrell | 340/172.5 |
| 3,407,387 | 10/1968 | Looschen et al. | 340/172.5 X |
| 3,603,935 | 9/1971 | Moore | 340/172.5 |
| 3,638,198 | 1/1972 | Balogh | 340/172.5 |
| 3,648,252 | 3/1972 | Thron et al. | 340/172.5 |
| 3,701,109 | 10/1972 | Peters | 340/172.5 |
| 3,710,324 | 1/1973 | Cohen et al. | 340/172.5 |

*Primary Examiner*—Mark E. Nusbaum
*Attorney, Agent, or Firm*—Arthur Decker; Nathan Cass; Kevin R. Peterson

[57] ABSTRACT

Disclosed is a computer system utilizing an interface unit for controlling coordination among central processor units and a peripheral such as a memory, in a temporal multiplex manner whereby a plurality of requests for access to the memory are clustered for response during a time period prior to grouping of other requests. The system includes at least two independently operable processors and a memory, the latter being connected to the former through the interface, and a positional or other priority resolver operable on a requestor group during the latter's access time period.

4 Claims, 1 Drawing Figure

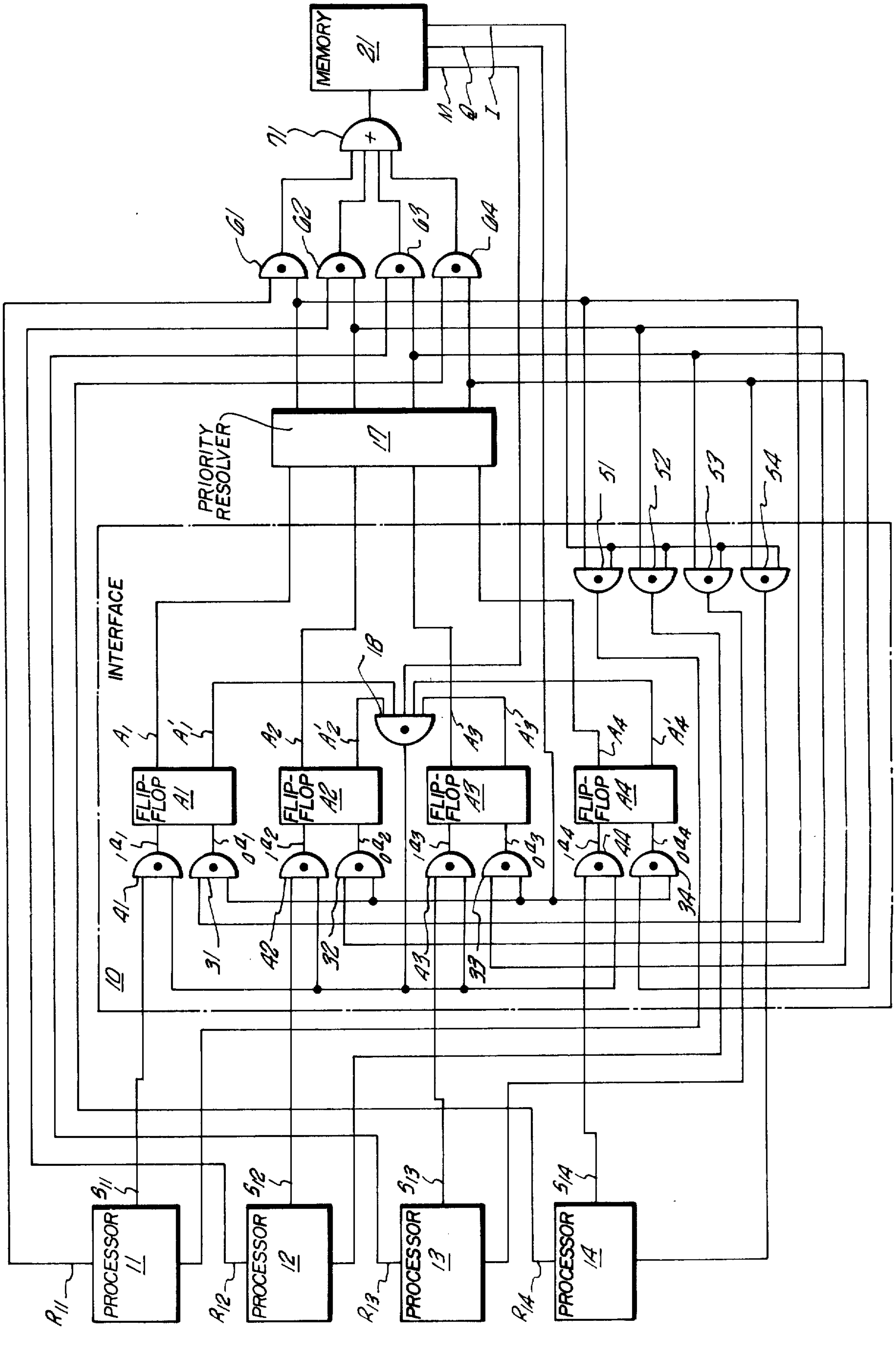
MEMORY
21
PRIORITY RESOLVER
17
INTERFACE
FLIP-FLOP A1
FLIP-FLOP A2
FLIP-FLOP A3
FLIP-FLOP A4
PROCESSOR 11
PROCESSOR 12
PROCESSOR 13
PROCESSOR 14

MULTIREQUEST GROUPING COMPUTER INTERFACE

BACKGROUND OF THE INVENTION

Computer technology has advanced to a point wherein hierarchical systems are quite common. Representative systems consist of modules such as memories, processors and multiplexors, not only of a variety of different types, but also with a wide selection of admixtures. Thus, in the same system, a plurality of processors may coordinate through an interface with a memory, and may emit requests for servicing by the memory asynchronously, usually because their temporal operation ("clock" rates), differs.

Conventional data processing systems have operated sequentially, i.e., the processor requests access to data in a memory and awaits transfer thereof before submitting another request, and in the case of plural processors, this activity has been serial in that a processor request is delayed recognition by the interface until the data transfer initiated by a prior request is completed.

If the system is set up on a requestor priority basis and, accordingly, includes a network for discriminating among requestors, assigning a weight factor to their requests and causing a response sequence in accordance therewith, in the case of simultaneous requests it is very possible that higher priority requestors may completely lock out access to the memory by lower priority requestors or that one of the former may even seize the memory away from one of the latter directly after access is granted but before response is made. Consequently, it is not unusual for a processor to devote a substantial portion of its activity in awaiting the receipt of requested data, a situation which a hierarchical system of size appropriate to the handling of the vast quantities of data characteristic of modern business enterprises, may find economically intolerable.

An approach to reducing the time-wasting effect of serial accesses in hierarchical systems has been based on the allocation of time periods during which sets of processor requests are exclusively handled. It is this type of system that the present invention represents.

SUMMARY OF THE INVENTION

The invention, then, makes use of the aforementioned approach and, as reduced to practice in its preferred embodiment, comprises an interface unit capable of providing cooperation between a plurality of central processor units and a memory unit.

The interface unit connects the processors and a priority resolving unit which controls access to the memory resolving unit which controls access to the memory through a network of gates which trigger memory elements (flip-flops). The outputs of the flip-flops effectuate connection and establish a time period therefor such that, during the period, all memory access request outputs of the processors are sensed and the processors corresponding to those which are energized are connected to the priority resolving unit (and thence to the memory) and accordingly, serviced before the generation of another processor access request sensing period is established. Thus, in effect, the interface provides for exclusive servicing of a plurality of processor units by a priority resolving unit-memory unit combination in time period designated sets.

DESCRIPTION OF THE DRAWING

The FIGURE shows the interface unit of the present invention in block diagram form as associated with four processor units, a priority resolving unit and a memory unit.

DESCRIPTION OF THE PREFERRED EMBODIMENT

Referring to the drawing, it is seen that a typical application of interface unit 10 is to a plurality (here, four) of processors 11, 12, 13, 14 and to a priority resolving unit 17 connected to memory 21 through a network of gates 61, 62, 63, 64, 71.

Although the inventive concept is quite applicable to other systems of representing information in a computer, it will be presented herein with regard to digital representation in a binary system. By this is meant a system in which signals are bivalued, alternating between a pair of specific voltage levels, as, for instance, +10 volts and zero volts (ground potential) present on a line; representation may be considered the binary value 1 for the +10 volt level and the binary value 0 for ground level.

The circuits shown in the drawing are used to perform various logical operations such as storage, "AND" and "OR" and are configured in the form of rectangles representing storage (memory) elements and D-shapes including a dot sign, representing AND gates, or including a plus sign, representing OR gates.

The memory elements are electronic devices (flip-flops) having two possible steady state conditions. One of these conditions is referred to as "set" and the other condition is referred to as "reset"; when a flip-flop is described as being set, it will be understood to be storing a bit having the value 1, and when it is described as reset, it will be understood to be storing a bit having the value 0. The flip-flops are characterized by two inputs, only one of which may have an actuating signal at a time, and two outputs having complementary voltages.

The nomenclature selected employs combinations of letters and numbers for designating the flip-flops and their input and output signals. The flip-flops themselves are designated by combinations of upper case letters and numbers; thus, flip-flop Al, etc. One output signal of the flip-flop is characterized by the corresponding upper case letter with the associated number shown as a subscript; thus signal $A_1$, etc. In order to distinguish the complementary output of the flip-flop, it is accompanied by an affixed prime; thus, signal $A_1$,' etc. It will be understood that the output signals partake of the aforementioned pair of voltage levels (+10 volts and 0 volts) on a line, and, when the unprimed signal output of a flip-flop is high in voltage and the primed signal output is low in voltage, the flip-flop is set, while, for the reverse condition, the flip-flop is reset; thus, flip-flop A1 is set when signal $A_1$ is at +10 volts and signal $A_1'$ is at 0 volts and it is reset when signal $A_1$ is at 0 volts and signal $A_1'$ is at +10 volts.

On the other hand, the signals to the flip-flops are designated by corresponding lower case letters with the associated number shown as a subscript. The input signal for rendering the flip-flop set is designated by a subscript 1 prefixing the lower case letter; thus, signal ${}_1a_1$, etc. The input signal for rendering the flip-flop reset is designated by a subscript O prefixing the lower case letter; thus, signal ${}_0a_1$, etc.

From the above, it is apparent that the embodiment chosen to teach the present invention will make use of the R-S flip-flop, and also chosen are the logical connectives AND and (inclusive) OR. However, it should be understood that any of the memory elements and connectives known to logic designers, such as described in the book, "Logical Design of Digital Computers" by M. Phister Jr., Wiley and Sons, Inc., N.Y. 1958, pages 53 through 56 and 121 through 132, may also comprise suitable choices.

For the system disclosed herein, a memory access transaction between a processor and a memory involves two phases: a request phase followed by a response phase. During the request phase, the processor issues a memory access request signal, a memory address comprising both the memory designation and a word address identifying a location within the memory, command signals describing the type of operation desired, and, for a memory write operation, signals representing the information to be stored. During the subsequent response phase, the memory returns status (busy or not busy) signals and, for a memory read operation, signals representing the information content of the addressed location. Such a memory access operation is quite conventional in computer systems, although its details vary among systems and, if an example is desired, reference may be made to Kotak et al U.S. Pat. No. 3,810,110, although, actually, the present invention probably would find best accommodation in the Burroughs B6700 computer (see Wollum et al U.S. Pat. No. 3,609,700) marketed by the Burroughs Corporation, Detroit, Michigan.

The memory access request signal, designated signals $S_{11}$, $S_{12}$, $S_{13}$, $S_{14}$ for the respective processors 11, 12, 13, 14, appear on lines comprising one input to corresponding AND gates 41, 42, 43, 44. The other input to each of these gates is the output of AND gate 18 and their outputs trigger set inputs ${}_1a_1$, ${}_1a_2$, ${}_1a_3$, ${}_1a_4$ of flip-flops A1, A2, A3, A4, respectively.

The address, command and information signals, for simplicity, will be treated compositively under the designations $R_{11}$, $R_{12}$, $R_{13}$, $R_{14}$; each comprises one (grouped) input to corresponding AND gates 61, 62, 63, 64. The other input to each of these gates is supplied by the outputs of priority resolution unit 17, which, for simplicity, may be considered a scanner which serializes its inputs (outputs $A_1$, $A_2$, $A_3$, $A_4$ from flip-flops A1, A2, A3, A4, respectively) in some preset sequence; scanners of this type are exemplified by those shown in Balogh, Jr. U.S. Pat. No. 3,648,198 (FIG. 3*a*. scanner 36 referred to in column 3, line 2, et seq. and column 4, line 42, et seq.) or in Peters U.S. Pat. No. 3,701,109 (FIG. 2, priority accessing circuit 120 described in column 5, line 47, et seq.). The outputs of these gates are combined in OR gate 71 for presentation to memory 21.

As is conventional in computer systems, a memory is assigned a unique designation and is responsive to a memory cycle request having an address containing its particular unit designation. When it detects its code and a request for a memory operation, and if it is free to execute the requested operation, it issues a ready signal indicating the beginning of the memory cycle and the acceptance of the information accompanying the request. Accordingly, memory 21 provides ready signal M when it recognizes its unique code and begins a memory operation; this signal connects as one input to gate 18, the other inputs to which comprise the reset outputs $A_1'$, $A_2'$, $A_3'$ $A_4'$ of flip-flops A1, A2, A3, A4, respectively.

After a memory is triggered to perform an operation, the operation proceeds internally. When information is read from the addressed location, the memory transmits a plurality of signals representing the information together with a signal indicating the presence of information signals. Accordingly, information signal I from memory 21 is a composite and is connected as one input to gates 51, 52, 53, 54, the outputs of which are received by processors 11, 12, 13, 14, respectively. The other inputs to these gates are the respective outputs of priority resolving unit 17, thereby assuring that communication is effectuated between memory 21 and the appropriate processor.

Signal Q indicates the presence of signal I and also signifies the completion of the memory operation. This signal is fed as an input to gates 31, 32, 33, 34, the other inputs to which are again the respective outputs of priority resolving unit 17. The outputs of these gates trigger reset inputs ${}_0a_1$, ${}_0a_2$, ${}_0a_3$, ${}_0a_4$ of flip-flops A1, A2, A3, A4. Signal Q, therefore, will reset the flip-flop whose present set condition is being gated through by priority resolving unit 17.

As an example of the operation of the above arrangement of components and connections, and presuming that all flip-flops in interface unit 10 are reset as a result of a prior memory access sequence, that priority resolving unit 17 sequences positionally (i.e., passes signals $A_1$, $A_2$, $A_3$, $A_4$ through in that order), that memory 21 is free (signal M is high) and that processors 11, 13 and 14 seek access to memory 21, signals $S_{11}$, $S_{13}$, $S_{14}$, respectively, and signals $R_{11}$, $R_{13}$, $R_{14}$, respectively will be generated. Accordingly, gates 18, 41, 43, 44 are energized and flip-flops A1, A3, A4 are set. This activity closes gate 18; therefore, a subsequent request signal $S_{12}$, if generated by processor 12, will be locked out by gate 42.

Priority resolving unit 17 now scans its processor inputs and allocates a sequential access by signals $R_{11}$, $R_{13}$, $R_{14}$ through gates 61, 63, 64 to memory 21. This access is in accordance with the positional priority scheme, i.e., processor 11 prior to processor 13 and processor 13 prior to processor 14. Each time that memory 21 is free to comply with a request, it generates an output (+10 volt level) signal M and each time it generates a response, it produces an output signal Q as well as information signals I. The first signal Q will set flip-flop A1 (via gate 41) whereas the first signals I will be received (via gate 51) by processor 11 and similarly for the second signals Q and I with regard to flip-flop A3 and processor 13 and the third signals Q and I with regard to flip-flop A4 and processor 14.

After processor 14 is serviced, memory 21 will again emit signal M, which, together with the reset conditions of flip-flops A1, A2, A3, A4, will (via gate 18) ready interface unit 10 for another set of requests from the processor group.

It is again remarked that the invention has been described with regard to specific components and connections. Since the invention may quite easily be adapted to other configurations without a substantial change in essence, it follows that such adaptations are within its scope. Thus, extension to more than four processors or a plurality of memories have been relegated to those skilled in the art since, to a great extent, these are determined by the preferred data handling requirements. Briefly, the present description should be considered exemplary for teaching those skilled in the computer arts and not constrained to the showing herein or in the reference.

What is claimed is:

1. An interface between a plurality of requestors and a requestor priority resolving network servicing a responder, the requestors being capable of emitting signals representing the desire for a response, addresses within the responder and information and the responder being capable of emitting signals representing readiness to transmit, information and the end of the information, and the priority resolving network being capable of effectuating sequencing of requestor address-information signals on input lines, one corresponding to each requestor, by energizing its output lines, one corresponding to each requestor, comprising:

means responsive to a responder ready signal and a set of requestor response-desired signals made up from at most one from each requester to energize corresponding priority resolving network inputs;

means responsive to a responder ready signal to inhibit operation of said energizing means such that a subsequent set of requestor response-desired signals do not affect priority resolving network inputs until all members of a present set are services by the responder; and means responsive to priority resolving network output signals to return a responder information signal to the corresponding requestor.

2. The interface of claim 1; and means responsive to responder end-of-information signals to inactivate that portion of said inhibiting means corresponding to a requester serviced by the responder.

3. The interface of claim 2 wherein said energizing means comprises a set of memory elements, one corresponding to each requestor and connected to receive its response-desired signal, and a set of gates, one corresponding to an input to each of said memory elements, and said inactivating means comprises a set of gates, one corresponding to another input to each of said memory elements.

4. The interface of claim 3 wherein said memory elements are flip-flops.

* * * * *

UNITED STATES PATENT AND TRADEMARK OFFICE

CERTIFICATE OF CORRECTION

PATENT NO. : 3,921,145

DATED : November 18, 1975

INVENTOR(S) : Michael G. Emm and Dongsung R. Kim

It is certified that error appears in the above-identified patent and that said Letters Patent are hereby corrected as shown below:

Col. 1, line 54, delete "resolving unit which controls access to the memory".
Col. 3, line 38, change "${}_{a}a_{3}$" to --${}_{1}a_{3}$--.
line 50, change "3,648,198" to --3,638,198--.
Col. 5, line 19, change "requester" to --requestor--.
Col. 6, line 2, change "services" to --serviced--.
line 10, change "requester" to --requestor--.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*